US009684102B2

(12) United States Patent
Suzuki et al.

(10) Patent No.: US 9,684,102 B2
(45) Date of Patent: Jun. 20, 2017

(54) DISPLAY DEVICE

(71) Applicant: Funai Electric Co., Ltd., Osaka (JP)

(72) Inventors: Yuto Suzuki, Kyotanabe (JP); Kazuya Tanaka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 102 days.

(21) Appl. No.: 14/590,536

(22) Filed: Jan. 6, 2015

(65) Prior Publication Data

US 2015/0192706 A1 Jul. 9, 2015

(30) Foreign Application Priority Data

Jan. 8, 2014 (JP) .................................. 2014-001772

(51) Int. Cl.
*G02B 5/02* (2006.01)
*G02B 7/00* (2006.01)
*F16M 11/02* (2006.01)

(52) U.S. Cl.
CPC ........... *G02B 5/0278* (2013.01); *F16M 11/02* (2013.01)

(58) Field of Classification Search
CPC ............................. G02B 5/0278; F16M 11/02
USPC ....................................................... 359/599
See application file for complete search history.

(56) References Cited

U.S. PATENT DOCUMENTS

| 2002/0080298 A1* | 6/2002 | Fukayama | ........ G02F 1/133308 349/58 |
| 2013/0250550 A1* | 9/2013 | Hirasawa | .................. H05K 7/14 362/97.1 |
| 2014/0111735 A1* | 4/2014 | Cho | .................. G02F 1/133608 349/58 |
| 2015/0293290 A1* | 10/2015 | Ogino | ...................... H04N 5/66 348/791 |

FOREIGN PATENT DOCUMENTS

JP 2002-196312 A 7/2002

* cited by examiner

*Primary Examiner* — Grant Gagnon
(74) *Attorney, Agent, or Firm* — Osha Liang LLP

(57) ABSTRACT

A display device includes a display, a rear frame disposed on a rear side of the display and comprising a rear frame-side engagement portion that protrudes toward the display in a front direction, and an optical sheet comprising an optical sheet-side engagement portion comprising a slit or a notch that engages with the rear frame-side engagement portion. The optical sheet-side engagement portion is snapped onto the rear frame-side engagement portion such that the optical sheet is suspended by the rear frame, and at least one of the rear frame-side engagement portion or the optical sheet-side engagement portion comprises a disengagement prevention portion that prevents the optical sheet-side engagement portion from disengaging in the front direction of the rear frame-side engagement portion.

18 Claims, 9 Drawing Sheets

[FIG. 1]
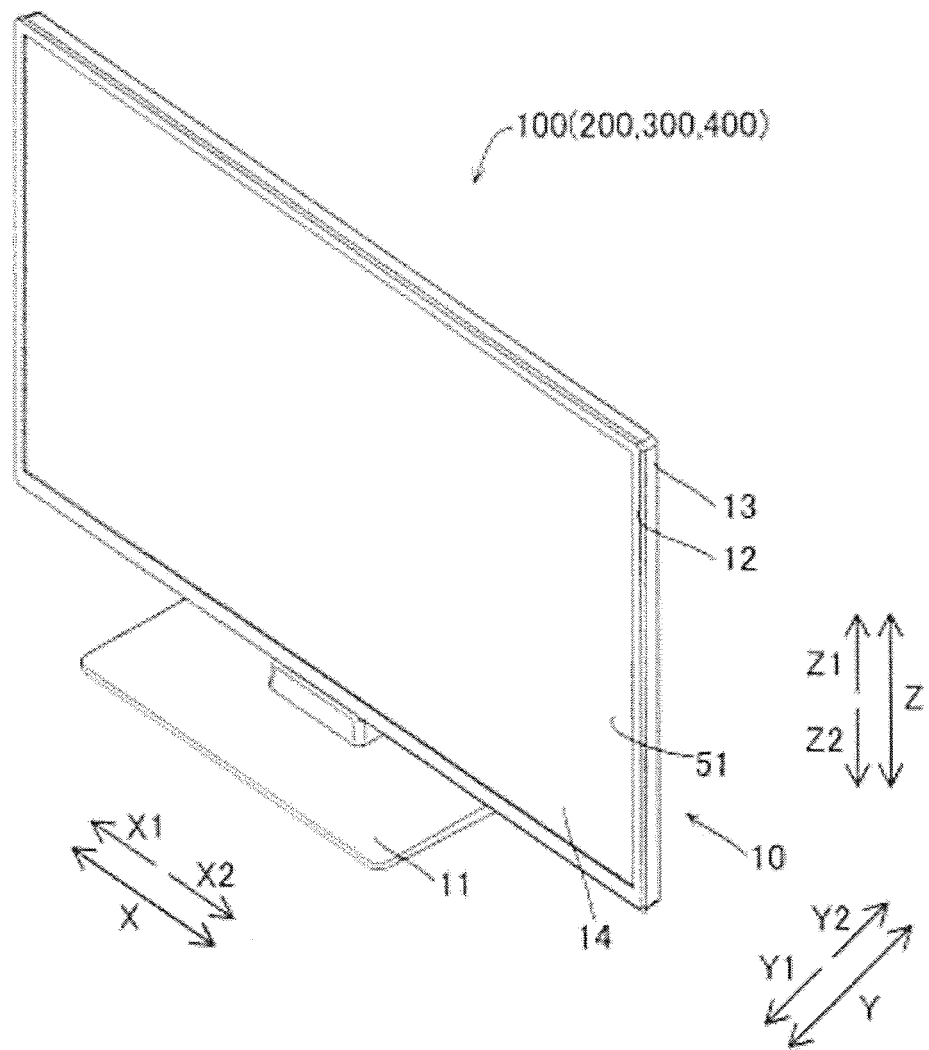

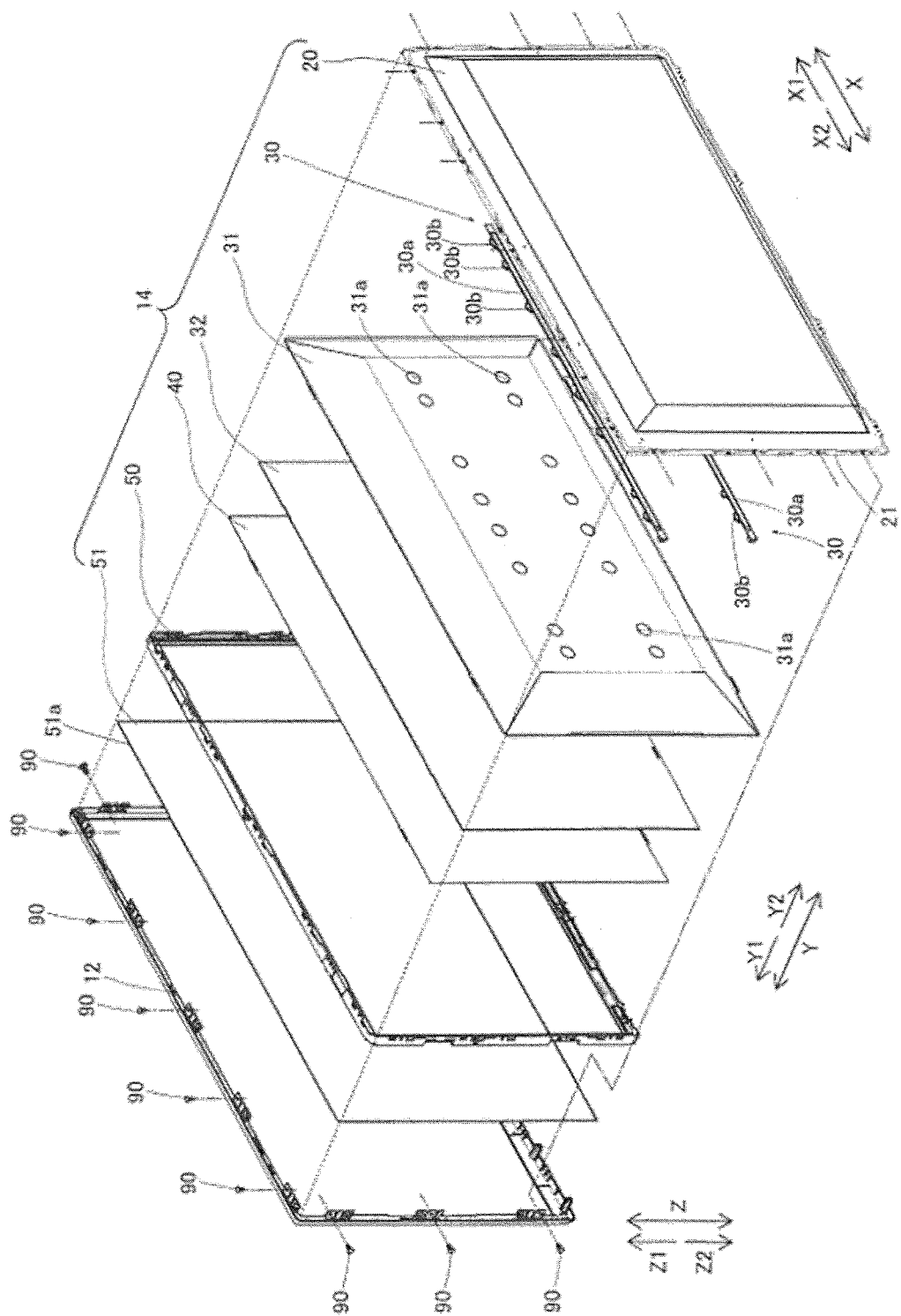
[FIG. 2]

[FIG. 3]
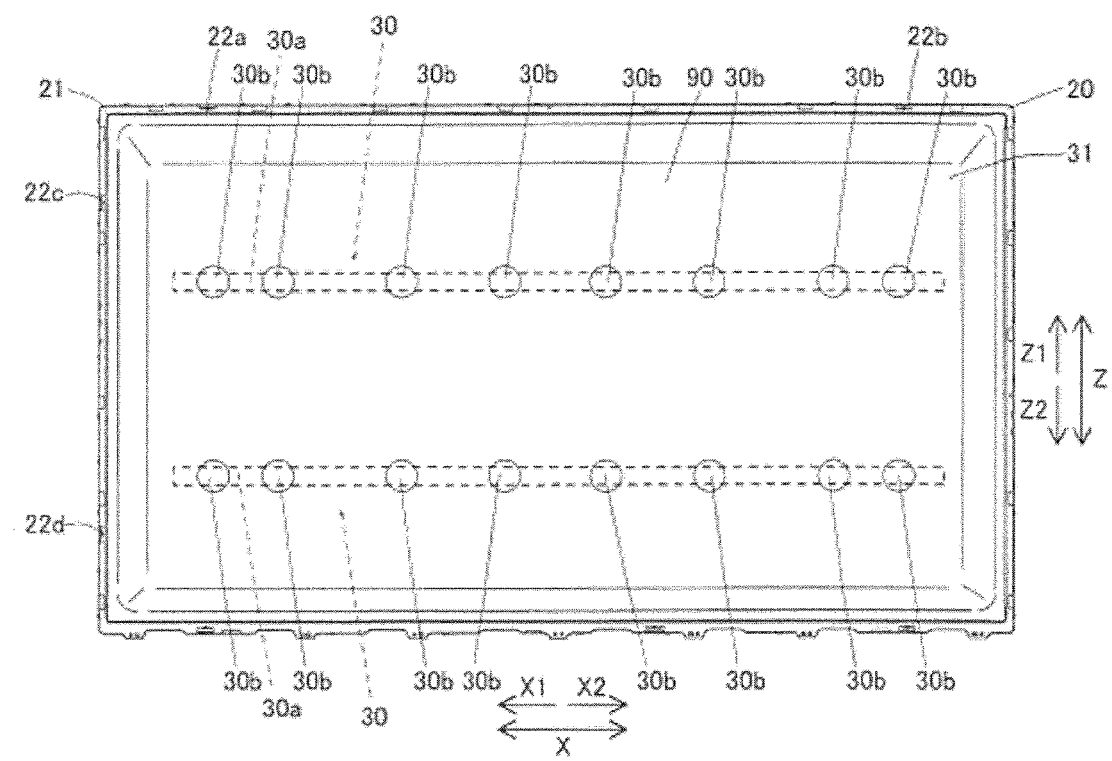

[FIG. 4]
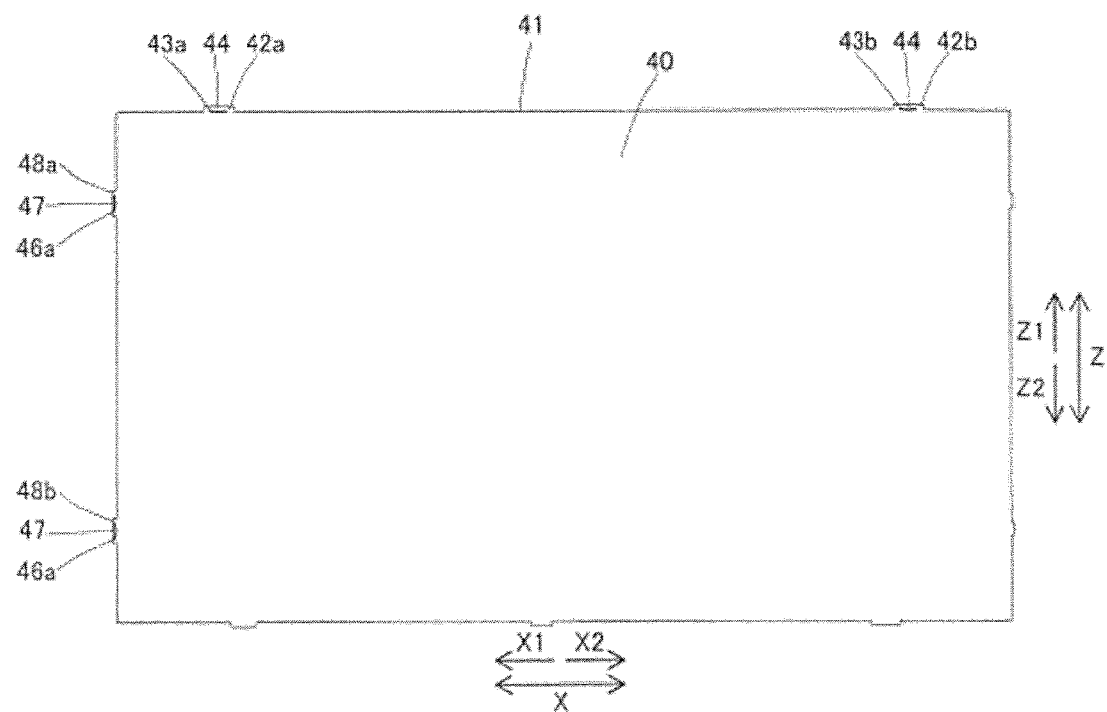

[FIG. 5]
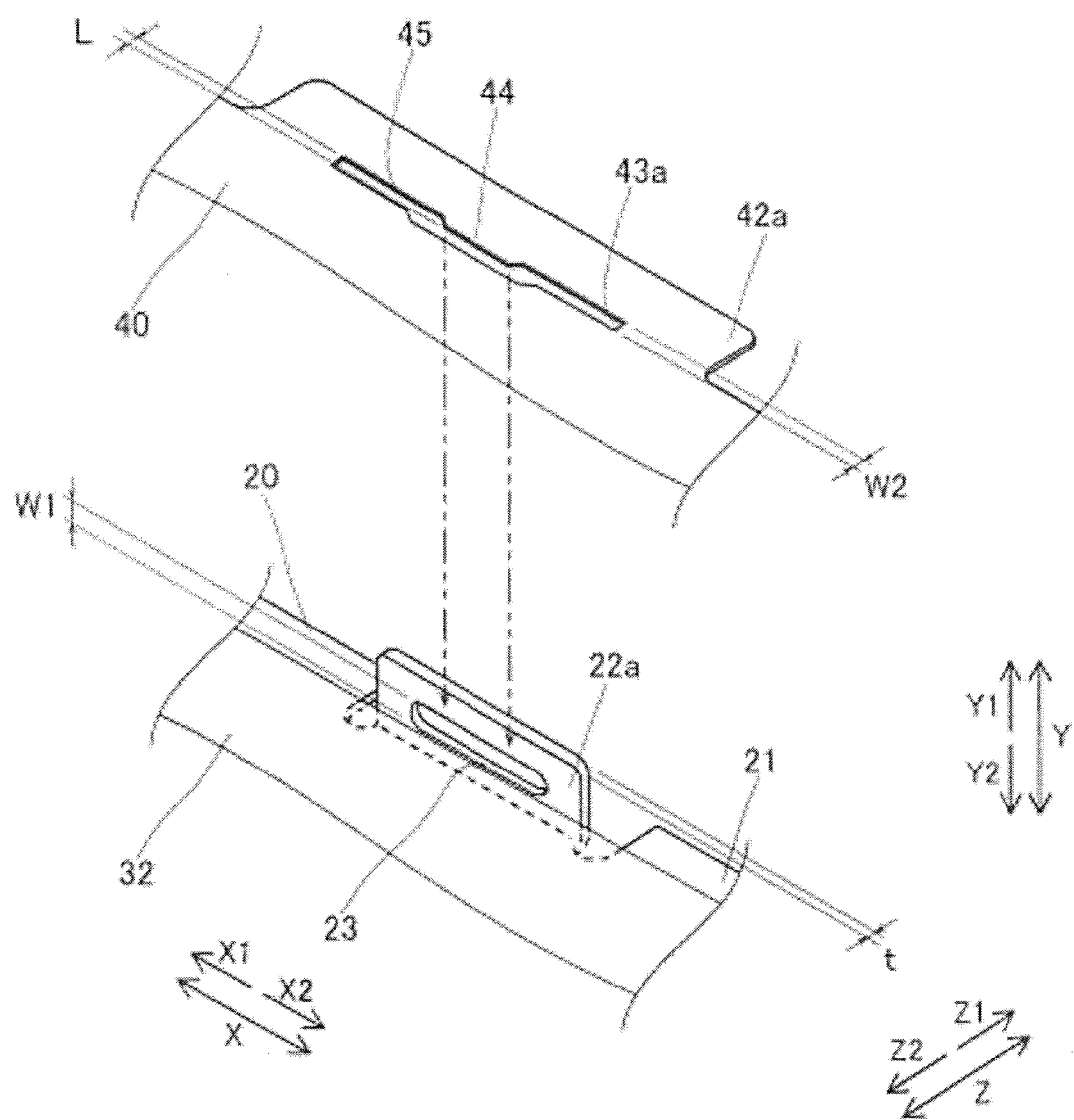

[FIG. 6]
First embodiment
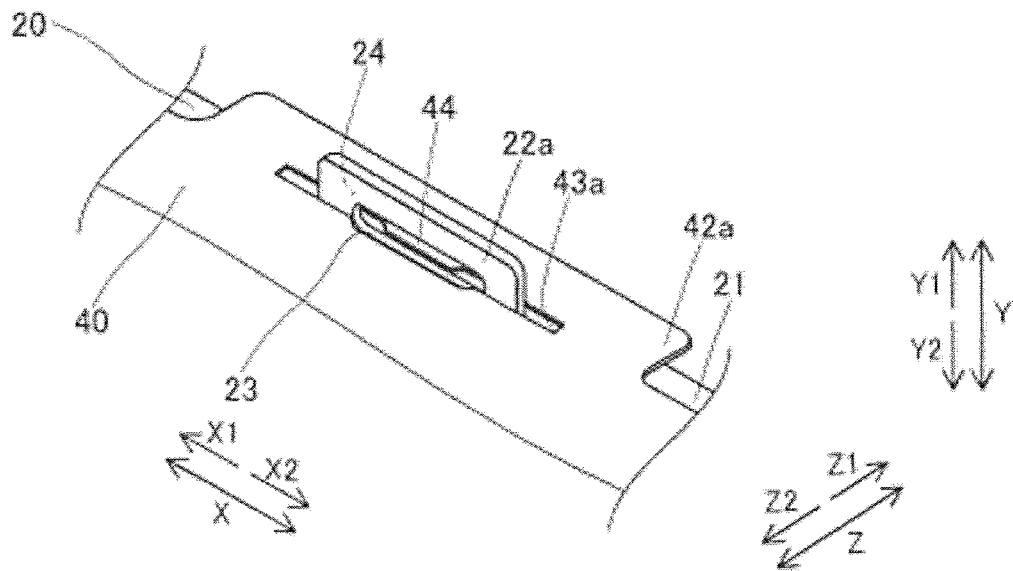
[FIG. 7]
First embodiment
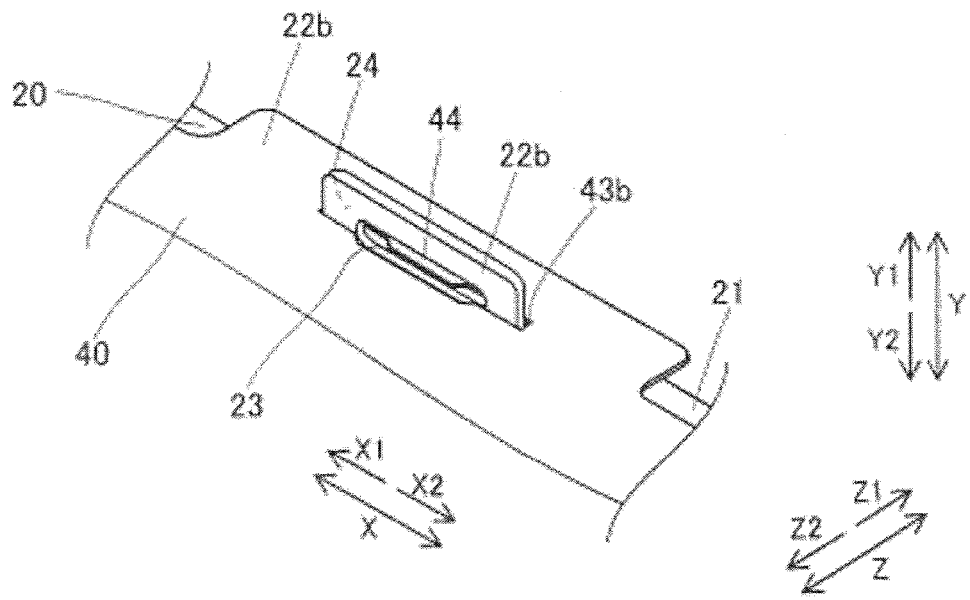

[FIG. 8]
Second embodiment
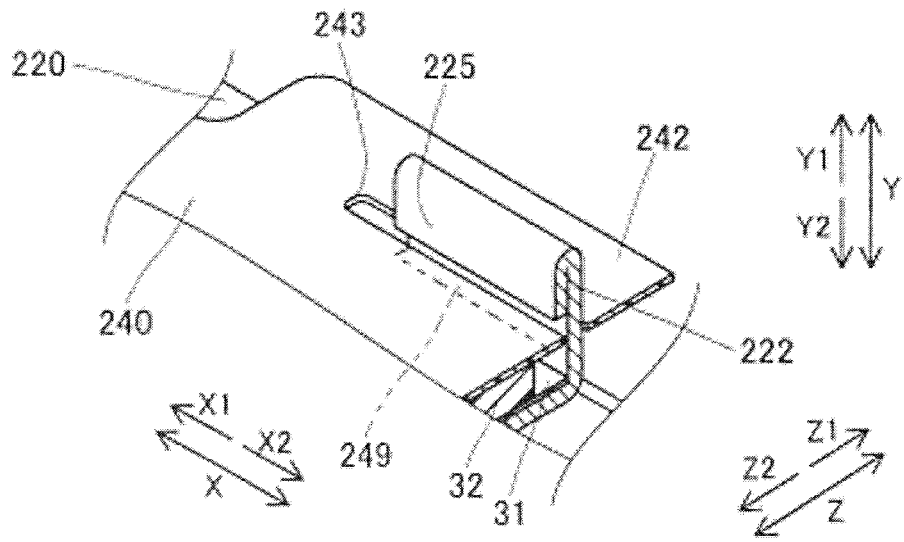
[FIG. 9]
Third embodiment
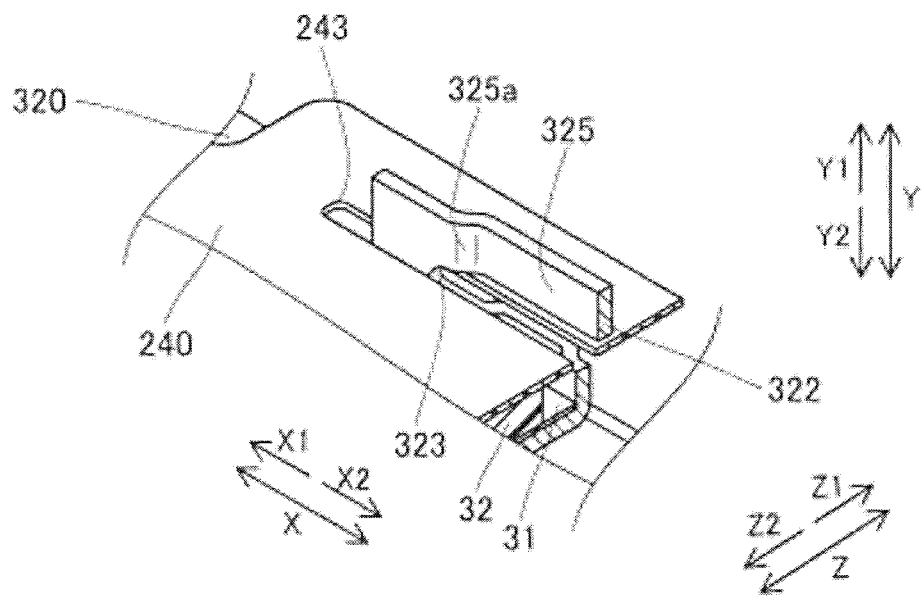

[FIG. 10]
Fourth embodiment
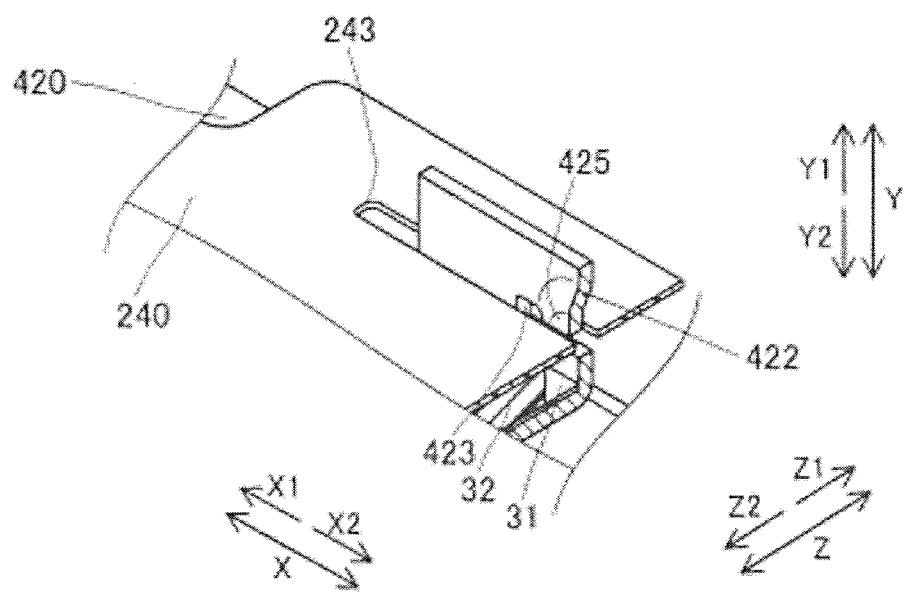
[FIG. 11]
First Modified Example
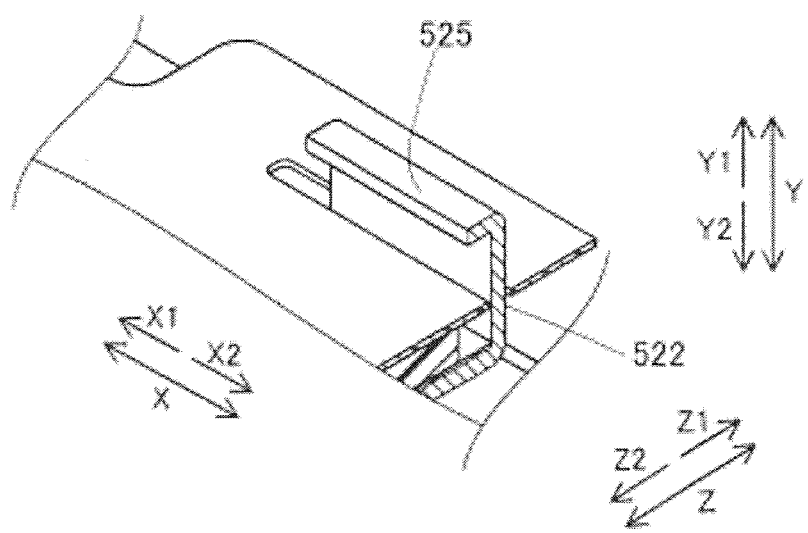

[FIG. 12]
Second Modified Example
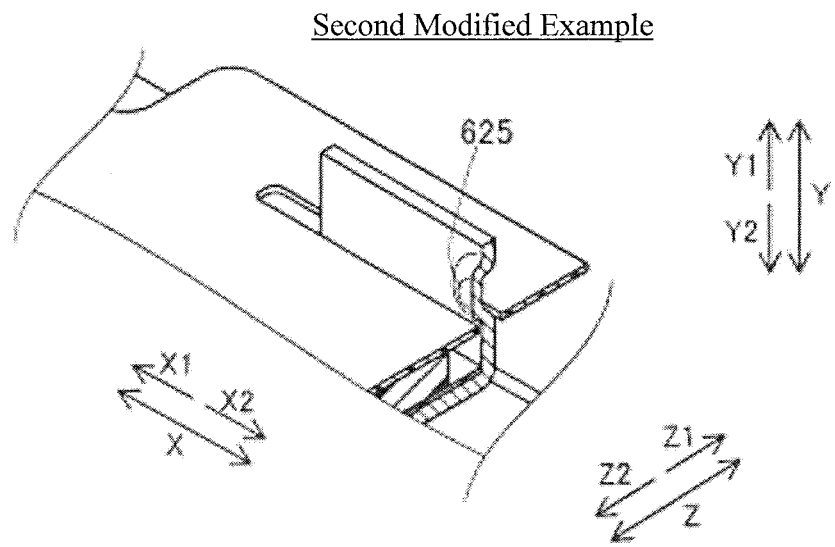
[FIG. 13]
Third Modified Example
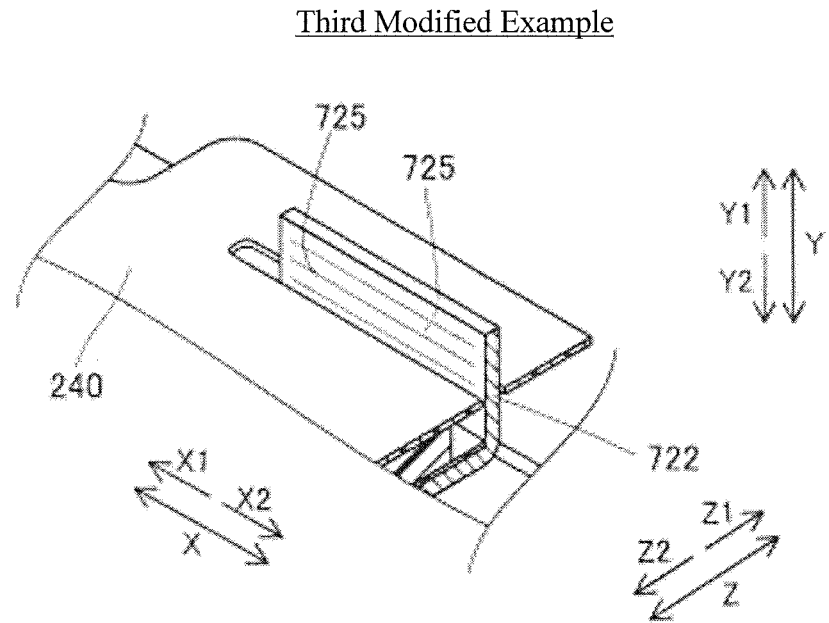

DISPLAY DEVICE

FIELD

The present invention relates generally to a display device, e.g., a display device provided with an optical sheet disposed between a display and a light source and a frame that supports the optical sheet by engagement.

BACKGROUND

Conventional display devices comprise an optical sheet disposed between a display and a light source and a frame that supports the optical sheet by engagement (for example, see Patent Document 1).

In Patent Document 1, a display device comprising a lower frame disposed in a rear direction of a display and an optical sheet supported by engaging with the lower frame is disclosed. Further, the lower frame has a columnar member that protrudes in a front direction on a display side from near an outer edge portion. Further, the optical sheet has a through hole that engages with the columnar member of the lower frame.

CITATION LIST

Patent Document

[Patent Document 1] Japanese Unexamined Patent Application Publication No. 2002-196312

However, during assembly of the display device according to Patent Document 1, due to a deflection or the like of the optical sheet, engagement between the columnar member of the lower frame and the through hole of the optical sheet is not maintained and the optical sheet falls out from the lower frame.

SUMMARY

A display device according to one or more embodiments can prevent an optical sheet from falling out of a frame during assembly.

In one aspect, a display device according to one or more embodiments may comprise: a display; a rear frame disposed on a rear side of the display and comprising a rear frame-side engagement portion that protrudes toward the display in a front direction; and an optical sheet comprising an optical sheet-side engagement portion comprising a slit or a notch that engages with the rear frame-side engagement portion, wherein the optical sheet-side engagement portion may be snapped onto the rear frame-side engagement portion such that the optical sheet is suspended by the rear frame, and at least one of the rear frame-side engagement portion or the optical sheet-side engagement portion may comprise a disengagement prevention portion that prevents the optical sheet-side engagement portion from disengaging in the front direction of the rear frame-side engagement portion.

According to one or more embodiments, the disengagement prevention portion can prevent the optical sheet-side engagement portion from disengaging in the front direction. At least the rear frame-side engagement portion or the optical sheet-side engagement portion provides the disengagement prevention portion that prevents the optical sheet-side engagement portion from disengaging in the front direction of the rear frame-side engagement portion. As a result, a state in which the optical sheet-side engagement portion is fitted into (or snapped onto) the rear frame-side engagement portion is maintained, and the optical sheet can be prevented from falling out of the rear frame during assembly. Further, because at least the rear frame-side engagement portion or the optical sheet-side engagement portion includes the disengagement prevention portion, the display device can be assembled with fewer components compared to a configuration in which the disengagement prevention portion is provided separately.

According to one or more embodiments, the rear frame-side engagement portion may be formed in a plate-like shape extending along a direction in which an upper edge of the display extends, the slit or the notch may have an elongated shape, the rear frame-side engagement portion may be snapped onto the slit or the notch, and the optical sheet-side engagement portion may be snapped onto the rear frame-side engagement portion so as to engage with the optical sheet-side engagement portion. By configuring in this manner, for example, the rear frame-side engagement portion can be formed in a plate-like shape, and the optical sheet-side engagement portion can be configured by a slit or the notch having an elongated shape; therefore, an edge portion of the display device can be formed to be small (narrow) in a width direction.

According to one or more embodiments, the rear frame-side engagement portion and the optical sheet-side engagement portion may at least partially overlap each other at the disengagement prevention portion, when viewed from a front side of the display device. By configuring in this manner, for example, the rear frame-side engagement portion overlaps in a direction in which the optical sheet-side engagement portion falls out; therefore, the optical sheet can be effectively prevented from falling out of the rear frame during assembly.

According to one or more embodiments, the rear frame-side engagement portion may comprise a hole portion that penetrates through the rear frame-side engagement portion in a thickness direction, the optical sheet-side engagement portion may comprise an engagement hole portion that engages the rear frame-side engagement portion and a protruding portion that protrudes to a hole-portion side of the rear frame-side engagement portion and abuts an inside of the hole portion, and the rear frame-side engagement portion may be snapped onto the engagement hole portion to be engaged with the optical sheet-side engagement portion such that the optical sheet-side engagement portion is prevented, by the protruding portion of the optical sheet-side engagement portion abutting an inner face of the hole portion of the rear frame, from disengaging in the front direction from the rear frame-side engagement portion. By configuring in this manner, for example, the optical sheet-side engagement portion can be prevented from disengaging in the front direction from the rear frame-side engagement portion by the protruding portion abutting the inner face of the hole portion; therefore, a protruding height of a portion of the rear frame-side engagement portion that protrudes more in a front-direction (front direction of the display) side than the optical sheet can be made small. As a result, the edge portion of the display device can be formed to be small (narrow) in a thickness direction.

According to one or more embodiments, a protruding amount of the protruding portion may be greater than a difference between a width of the engagement hole portion and a thickness of the rear frame-side engagement portion in a protruding direction of the protruding portion. By configuring in this manner, for example, the protruding portion of the optical sheet-side engagement portion can be made to reliably abut the inner face of the hole portion of the rear frame-side engagement portion; therefore, the optical sheet can be more reliably prevented from falling out of the rear frame during assembly.

According to one or more embodiments, the rear frame-side engaging portion may comprise a bent portion or a narrowed portion of a convex shape, and the bent portion or the narrowed portion overlap may the optical sheet-side engagement portion when viewed from a front side of the disengagement prevention portion. By configuring in this manner, for example, the rear frame-side engagement portion and the optical sheet-side engagement portion can overlap with a simple configuration of forming the bent portion or the narrowed portion of the rear frame-side engagement portion by a bending process or a narrowing process; therefore, the optical sheet can be easily and reliably prevented from falling out of the rear frame during assembly.

One or more embodiment of the present invention can provide a display device that can prevent the optical sheet from falling out of the frame during assembly.

BRIEF DESCRIPTION OF DRAWINGS

FIG. 1 is a perspective view illustrating an overall configuration of a display device according to one or more embodiments of a first example of the present invention.

FIG. 2 is an exploded perspective view of a display module and a front cabinet of the display device according to one or more embodiments of the first example of the present invention.

FIG. 3 is a diagram illustrating a state of the display device according to one or more embodiments of the first example of the present invention where an LED light source and a reflective sheet are installed on a rear frame.

FIG. 4 is a diagram illustrating an optical sheet of the display device according to one or more embodiments of the first example of the present invention.

FIG. 5 is a perspective view illustrating a state before one engagement hole portion of the optical sheet is installed to one engagement plate portion of the rear frame of the display device according to one or more embodiments of the first example of the present invention.

FIG. 6 is a perspective view illustrating a state where one engagement hole portion of the optical sheet is installed to one engagement plate portion of the rear frame of the display device according to one or more embodiments of the first example of the present invention.

FIG. 7 is a perspective view illustrating a state where another engagement hole portion of the optical sheet is installed to another engagement plate portion of the rear frame of the display device according to one or more embodiments of the first example of the present invention.

FIG. 8 is a perspective view illustrating a state where an engagement hole portion of an optical sheet is installed to an engagement plate portion of a rear frame of a display device according to one or more embodiments of a second example of the present invention.

FIG. 9 is a perspective view illustrating a state where an engagement hole portion of an optical sheet is installed to an engagement plate portion of a rear frame of a display device according to one or more embodiments of a third example of the present invention.

FIG. 10 is a perspective view illustrating a state where an engagement hole portion of an optical sheet is installed to an engagement plate portion of a rear frame of a display device according to one or more embodiments of a fourth example of the present invention.

FIG. 11 is a perspective view illustrating a state where an engagement hole portion of an optical sheet is installed to an engagement plate portion of a rear frame of a display device according to one or more embodiments of a first modified example of the present invention.

FIG. 12 is a perspective view illustrating a state where an engagement hole portion of an optical sheet is installed to an engagement plate portion of a rear frame of a display device according to one or more embodiments of a second modified example of the present invention.

FIG. 13 is a perspective view illustrating a state where an engagement hole portion of an optical sheet is installed to an engagement plate portion of a rear frame of a display device according to one or more embodiments of a third modified example of the present invention.

DESCRIPTION OF EMBODIMENTS

Embodiments of the present invention will be described below based on the drawings.

First Example

A configuration of a display device 100 according to one or more embodiments of a first example of the present invention will be described with reference to FIGS. 1 to 7. The display device 100 is an example of a "display device" of the present invention.

For illustration purposes, in the description below, a direction heading toward a front side of the display device 100 is defined as a front direction (Y1 direction), and a direction heading toward a rear side thereof is defined as a rear direction (Y2 direction). Further, a direction orthogonal to a longitudinal direction (Y direction) and a vertical direction (Z direction) is defined as a lateral direction (X direction).

As illustrated in FIG. 1, the display device 100 according to one or more embodiments of the present invention may comprise a display device main body 10 and a stand member 11 that supports the display device main body 10 from a lower direction (Z2 direction). Further, the display device main body 10 may comprise a front cabinet 12 disposed on a front side (Y1-direction side), a rear cabinet 13 disposed on a rear side (Y2-direction side), and a display module 14 disposed between the front cabinet 12 and the rear cabinet 13.

As illustrated in FIG. 2, the display module 14 of the display device 100 may comprise, in order from a rear-direction side (Y2-direction side), a rear frame 20, an LED light source 30, a reflective sheet 31 comprising a plurality of hole portions 31a, a light diffusion plate 32 and an optical sheet 40 that condense and diffuse light from the LED light source 30, a mold frame 50, and a display panel 51. The display panel 51 is an example of a "display" of the present invention.

Furthermore, the display device 100 may be configured so the optical sheet 40 is installed to an outer edge portion 21 on an upper-direction side (Z1-direction side) of the rear frame 20. Further, the display device 100 may be configured so the optical sheet 40 is suspended from the outer edge portion 21 on the upper-direction side of the rear frame 20. Details will be described below. Further, the display device 100 may be configured so the display device main body 10 is rotatable 90 degrees in a clockwise direction relative to the stand member 11 when viewed from the front-direction side (Y1-direction side). That is, the display device 100 may be configured so an end portion on an X1-direction side moves to the upper-direction side (Z1-direction side) by rotation.

Next, configurations of various components of the display device 100 according to one or more embodiments of the present invention will be described with reference to FIGS. 1 to 7.

The rear frame 20 may be made of metal and, as illustrated in FIGS. 2 and 3, may be formed as a trapezoidal box whose front direction (Y1-direction side) opens. Further, the rear frame 20 may house a pair of LED light sources 30 inside.

The LED light source 30 may comprise an LED support portion 30a of a rod shape and a plurality of LEDs 30b supported by the LED support portion 30a. Further, the LED support portion 30a may be disposed on a rear-direction side (Y2-direction side) of the reflective sheet 31. Further, the LEDs 30b may be exposed on a front-direction side (Y1-direction side) of the reflective sheet 31 by passing though the hole portions 31a of the reflective sheet 31 from the rear direction (Y2 direction). Further, the rear frame 20 may be configured so the reflective sheet 31, the light diffusion plate 32, and the optical sheet 40 are disposed so as to overlap in order along a front-direction side (Y1-direction side) of the outer edge portion 21.

The reflective sheet 31 can reflect light from the LEDs 30b heading toward the rear direction (Y2 direction) to a display-panel-51 side in the front direction (Y1 direction). Further, the reflective sheet 31 may be formed to a thickness of about 0.188 mm.

Furthermore, as illustrated in FIG. 3 and FIGS. 5 to 7, the rear frame 20 may comprise engagement plate portions 22a (not illustrated in FIG. 7) and 22b (not illustrated in FIGS. 5 and 6) of a plate shape that each protrude from the outer edge portion 21 in the front direction (Y1 direction) of the display-panel-51 side on an X1-direction side and an X2-direction side of the outer edge portion 21 on the upper-direction side (Z1-direction side). Further, the size of the engagement plate portion 22a and the engagement plate portion 22b may be equivalent in the lateral direction (X direction). The engagement plate portions 22a and 22b are an example of a "rear frame-side engagement portion" of the present invention.

Furthermore, as illustrated in FIG. 5, the engagement plate portion 22a (22b) of the rear frame 20 may be formed by cutting and raising a portion of the outer edge portion 21 of the rear frame 20 extending in the vertical direction (Z direction) and the lateral direction (X direction) on the front-direction side (Y1-direction side). Further, the engagement plate portion 22a (22b) may be formed as a plate-like shape extending in the lateral direction (X direction) along a direction in which an upper edge 51a (see FIG. 2) of the display panel 51 extends. That is, the engagement plate portion 22a (22b) may be configured so the vertical direction (Z direction) is a thickness direction.

Furthermore, as illustrated in FIGS. 5 to 7, the engagement plate portion 22a (22b) may be formed to be rectangular when viewed from the Z1-direction side. Further, the engagement plate portion 22a (22b) may be formed so a thickness t is about 6 mm. Further, the engagement plate portion 22a (22b) may comprise a hole portion 23 that penetrates in the thickness direction (Z direction). This hole portion 23 of the engagement plate portion 22a (22b) may be formed as an elongated shape extending in the lateral direction (X direction). Further, the hole portion 23 of the engagement plate portion 22a (22b) may be configured so a width W1 in the longitudinal direction (Y direction) is greater than a thickness of the optical sheet 40. The hole portion 23 is an example of a "disengagement prevention portion" and an "overlapping portion" of the present invention.

As illustrated in FIG. 2, the light diffusion plate 32 may be formed from PC (polycarbonate). Further, the light diffusion plate 32 may be substantially rectangular when viewed from the front in the Y1 direction. Further, the light diffusion plate 32 may be formed to a thickness of about 1.5 mm. Further, the light diffusion plate 32 may be configured so the light from the LED light source 30 (LEDs 30b) is directly incident from a face on the rear-direction side (Y2-direction side). Further, the light diffusion plate 32 may be disposed in a state where the optical sheet 40 overlaps substantially an entire face of a front-direction side surface (Y1-direction side).

As illustrated in FIG. 2, the optical sheet 40 may be formed to a size and shape substantially identical to those of the light diffusion plate 32 when viewed from the front side in the Y1-direction. Further, the optical sheet 40 may be formed to a thickness of about 0.225 mm. Further, as illustrated in FIG. 2, the optical sheet 40 may comprise installation convex portions 42a and 42b of a rectangular shape projecting in the Z1 direction from an upper end portion 41. In each of these installation convex portions 42a and 42b, engagement hole portions 43a and 43b configured from a slit of an elongated shape extending in the lateral direction (X direction) may be formed. Further, a width in a short-hand direction (Z direction) of the engagement hole portion 43a (43b) may be about 1.0 mm. The engagement hole portions 43a and 43b are an example of an "optical sheet-side engagement portion" of the present invention.

As illustrated in FIGS. 5 to 7, these engagement hole portions 43a and 43b may be formed respectively in positions corresponding to the engagement plate portions 22a and 22b of the rear frame 20 in a state where the optical sheet 40 is installed to the rear frame 20. Further, a protruding portion 44 that protrudes to an inner side of the hole portion 23 of the engagement plate portion 22a (22b) and abuts an inside of the hole portion 23 may be formed in the engagement hole portion 43a (43b). That is, a protruding portion 44 may protrude in the Z2 direction from an end edge 45 on the upper-direction side (Z1-direction side) that forms the engagement plate portion 22a (22b) and is an elongated shape long in the lateral direction (X direction) and a trapezoidal shape in the front view from the Y1 direction side.

A protruding amount L of this protruding portion 44 may be set to about 0.6 mm. Further, the protruding amount L of the protruding portion 44 may be greater than a difference (W2−t) between a width W2 (about 1.0 mm) of the engagement hole portion 43a (43b) in the protruding direction (Z2 direction) of the protruding portion 44 and the thickness t (about 0.6 mm) of the engagement plate portion 22a (22b). Further, when installing the engagement hole portion 43a (43b) to the engagement plate portion 22a (22b) of the rear frame 20, the protruding portion 44 may temporarily bend as a result of a tip portion of the protruding portion 44 abutting a face 24 on an upper-direction side (Z1-direction side) of the engagement plate portion 22a (22b). The protruding portion 44 is an example of the "disengagement prevention portion" and the "overlapping portion" of the present invention.

Furthermore, the engagement plate portion 22a (22b) of the rear frame 20 and the protruding portion 44 of the optical sheet 40 may have overlapping portions where engagement portions in a disposed state of the display device 100 overlap each other when viewed from the front in the Y1-direction. Therefore, the optical sheet may prevent the protruding portion 44 from disengaging (falling out) in the front direction (Y1 direction) from the engaging plate portion 22*a* (22*b*) in a state where the engagement plate portion 22*a* (22*b*) is fitted into (or snapped onto) the engagement hole portion 43*a* (43*b*).

Furthermore, a width in a longitudinal direction (X direction) of the engagement hole portion 43*a* may greater than a width in a longitudinal direction (X direction) of the engagement hole portion 43*b*. Specifically, as illustrated in FIG. 6, the width in the longitudinal direction (X direction) of the engagement hole portion 43*a* may be greater than a width in a longitudinal direction (X direction) of the engagement plate portion 22*a* of the rear frame 20. Further, as illustrated in FIG. 7, the width in the longitudinal direction (X direction) of the engagement hole portion 43*b* may be substantially the same size (the engagement hole portion 43*a* is slightly larger) as a width in the longitudinal direction (X direction) of the engagement plate portion 22*b* of the rear frame 20.

In this manner, the optical sheet 40 may enable easy engagement between the engagement plate portion 22*a* and the engagement hole portion 43*a* by enlarging the width in the longitudinal direction (X direction) of the engagement hole portion 43*a* to be more than the width in the longitudinal direction (X direction) of the engagement hole portion 43*b*. Further, the optical sheet 40 may be installable to the rear frame 20 even when thermally expanded due to a temperature change of an external environment.

Furthermore, on the rear frame 20, as illustrated in FIG. 3, engagement plate portions 22*c* and 22*d* similar to those of the engagement plate portions 22*a* and 22*b* formed on the Z1-direction side may also be formed on the X1-direction side. Further, in the optical sheet 40, as illustrated in FIG. 4, engagement hole portions 46*a* and 46*b* similar to those of the engagement hole portions 43*a* and 43*b* above formed on the Z1-direction side may also be formed on the X1-direction side. A protruding portion 47 that protrudes on a hole portion inner side of the engagement plate portion 22*c* (22*d*) and abuts the inside of the hole portion may be formed in this engagement hole portion 46*a* (46*b*).

Specifically, the rear frame 20 may comprise engagement plate portions 22*c* and 22*d* that each protrude from the outer edge portion 21 in the front direction (Y1 direction) of the display-panel-51 side on an upper-direction side (Z1-direction side) and a lower-direction side (Z2-direction side) of the outer edge portion 21 on the X1-direction side. Further, the optical sheet 40 may comprise the engagement hole portions 46*a* and 46*b* each formed with the protruding portion 47 on installation convex portions 48*a* and 48*b*. Therefore, the rear frame 20 can retain by suspension the optical sheet when the display device main body 10 is rotated so that the X1-direction side is disposed in the upper direction (Z1 direction).

As illustrated in FIG. 2, the display panel 51 may display video based on the light from the LED light source 30 (LEDs 30*b*). The mold frame 50 may support a liquid crystal panel in a position determination state on the front-direction side (Y1-direction side) by a predetermined support portion. Further, the mold frame 50 can be tightened together with the front cabinet 12 to the rear frame 20 by screws 90 from the front-direction side (Y1-direction side). As a result, the optical sheet 40 can maintain a state where the engagement plate portion 22*a* (22*b*) of the rear frame 20 is fitted into (or snapped onto) the engagement hole portion 43*a* (43*b*) of the optical sheet 40. That is, the optical sheet 40 does not disengage from the rear frame 20.

According to one or more embodiments of the first example, the following advantages can be obtained.

According to one or more embodiments of the first example, because the protruding portion 44 and the hole portion 23 prevent the engagement hole portion 43*a* (43*b*) from disengaging in the front direction (Y1 direction), the optical sheet 40 can maintain a state in which the engagement hole portion 43*a* (43*b*) is fitted into (or snapped onto) the engagement plate portion 22*a* (22*b*). Further, the optical sheet 40 can be prevented from falling out from the rear frame 20 during assembly. Further, because the protruding portion 44 of the engagement hole portion 43*a* (43*b*) and the hole portion 23 of the engagement plate portion 22*a* (22*b*) prevent the optical sheet 40 from falling out of the rear frame 20, the display device 100 can be assembled with fewer components compared to a configuration in which the protruding portion 44 and the hole portion 23 are provided separately. Further, according to one or more embodiments, the protruding portion 44 of the engagement hole portion 43*a* (43*b*) and the hole portion 23 of the engagement plate portion 22*a* (22*b*) may be integrally formed in the rear frame 20 and the optical sheet 40, respectively.

According to one or more embodiments of the first example, the engagement plate portion 22*a* (22*b*) may be formed in a plate-like shape extending in the lateral direction (X direction) along the direction in which the upper edge 51*a* of the display panel 51 extends. Further, the engagement hole portion 43*a* (43*b*) may be configured by the slit of the elongated shape into which the engagement plate portion 22*a* (22*b*) is fitted for engagement. Further, the display device 100 can prevent the engagement hole portion 43*a* (43*b*) from disengaging in the front direction (Y1 direction) from the engaging plate portion 22*a* (22*b*) by the protruding portion 44 and the hole portion 23 in a state where the engagement plate portion 22*a* (22*b*) is fitted into (or snapped onto) the engagement hole portion 43*a* (43*b*) to be engaged therewith. As a result, the engagement plate portion 22*a* (22*b*) may be formed in a plate-like shape, and the engagement hole portion 43*a* (43*b*) may be configured by the slit of the elongated shape; therefore, an edge portion of the display device 100 can be formed to be small (narrow) in a width direction.

According to one or more embodiments of the first example, with the engagement plate portion 22*a* (22*b*) and the engagement hole portion 43*a* (43*b*), the engagement portions in the disposed state of the display device 100 may overlap each other when viewed from the front in the Y1-direction in the protruding portion 44 and the hole portion 23. As a result, the engagement plate portion 22*a* (22*b*) may overlap in the direction in which the engagement hole portion 43*a* (43*b*) falls out; therefore, the optical sheet 40 can be effectively prevented from falling out of the rear frame 20 during assembly.

According to one or more embodiments of the first example, the display device 100 may be configured so that in the state where the engagement plate portion 22*a* (22*b*) is fitted into the engagement hole portion 43*a* (43*b*) to be engaged therewith, the engagement hole portion 43*a* (43*b*) is prevented from disengaging in the front direction (Y1 direction) from the engagement plate portion 22*a* (22*b*) due to the protruding portion 44 abutting the inner face of the hole portion 23 of the rear frame 20. As a result, the engagement hole portion 43*a* (43*b*) may be prevented, by the protruding portion 44 abutting the inner face of the hole portion, from disengaging in the front direction (Y1 direction) from the engagement plate portion 22a (22b); therefore, a protruding height of a portion of the engagement plate portion 22a (22b) that protrudes more to the front-direction side (Y1-direction side) than the optical sheet 40 can be made small. As a result, the edge portion of the display device 100 can be formed to be small (narrow) in the thickness direction (Z direction).

According to one or more embodiments of the first example, the protruding amount L of the protruding portion 44 may be set to be greater than the difference (W2-t) between the width W2 of the engagement hole portion 23 in the protruding direction (Z direction) of the protruding portion 44 and the thickness t of the engagement plate portion 22a (22b). As a result, the protruding portion 44 can reliably abut the inner face of the hole portion 23 of the engagement plate portion 22a (22b); therefore, the optical sheet 40 can be more reliably prevented from falling out of the rear frame 20 during assembly.

Second Example

A configuration of a display device 200 according to one or more embodiments of a second example of the present invention will be described with reference to FIGS. 1 and 8. FIGS. 8 to 13 show a cross-sectional view. Further, shapes of engagement hole portions and engagement plate portions of a portion on a side (X2-direction side) that is not illustrated may be symmetrical relative to the cross section to shapes of engagement hole portions and engagement plate portions of a portion on a side (X1-direction side) that is illustrated. Further, configurations similar to those of the first example will be labeled with the same reference signs, and descriptions thereof will be omitted. The display device 200 is an example of the "display device" of the present invention.

According to one or more embodiments of this second example, unlike the first example where the engagement plate portion 22a (22b) of the rear frame 20 is prevented from disengaging from the engagement hole portion 43a (43b) of the optical sheet 40 by the hole portion 23 of the rear frame 20 and the protruding portion 44 of the engagement hole portion 46a (46b) of the optical sheet 40, an engagement plate portion 222 of a rear frame 220 is prevented from disengaging from an engagement hole portion 243 of an optical sheet 240 by a bent portion 225 of the rear frame 220.

As illustrated in FIG. 8, the display device 200 may comprise the optical sheet 240 and the rear frame 220. The engagement hole portion 243 configured from a slit of an elongated shape extending in the lateral direction (X direction) may be formed on an installation convex portion 242 of the optical sheet 240. The engagement hole portion 243 need not be formed with a protrusion portion 44 such as in the first example.

With the engagement plate portion 222 of the rear frame 220, a vicinity of a tip portion may be folded back (collapsed) to the lower-direction side (Z2-direction side) by a bending process so the tip portion faces the Y2-direction side in order to form the bent portion 225 of a convex shape on the lower-direction side (Z2-direction side). Further, the bent portion 225 may engage with an engagement face 249 of a predetermined region of the optical sheet 240 on the Y2-direction side of the bent portion 225. Further, the bent portion 225 may overlap the engagement face 249 in the front view from the Y1-direction side. The engagement plate portion 222 is an example of the "rear frame-side engagement portion" of the present invention. Further, the narrowed portion 225 is an example of the "disengagement prevention portion" of the present invention. Further, the engagement face 249 is an example of the "optical sheet-side engagement portion" of the present invention.

Other configurations of the second example may be similar to those of the first embodiment above.

According to one or more embodiments of the second example, the following advantages can be obtained.

According to one or more embodiments of the second example, similar to the embodiments of the first example, by providing the bent portion 225 that prevents the engagement hole portion 243 from disengaging in the front direction (Y1 direction) from the engagement plate portion 222, the optical sheet 240 can be prevented from falling out of the rear frame 220 during assembly. The engagement face 249 of the predetermined region and the bent portion 225 of the engagement plate portion 222 may be integrally formed in the rear frame 20 and the optical sheet 40, respectively. Further, because the engagement face 249 of the predetermined region and the bent portion 225 of the engagement plate portion 222 prevent the optical sheet 240 from falling out of the rear frame 220, the display device 200 can be assembled with fewer components compared to a configuration in which the engagement face 249 and the bent portion 225 are provided separately.

According to one or more embodiments of the second example, the bent portion 225 of the convex shape may overlap the engagement face 249 when viewed from the front in the Y1-direction. As a result, the bent portion 225 and the engagement face 249 can overlap with a simple configuration of forming the bent portion 225 by the bending process; therefore, the optical sheet 240 can be prevented from falling out from the rear frame 220 during assembly.

Other effects of the second example may be similar to those of the first example above.

Third Example

A configuration of a display device 300 according to one or more embodiments of a third example of the present invention will be described with reference to FIGS. 1 and 9. Further, configurations similar to those of the first and second examples will be labeled with the same reference signs, and descriptions thereof will be omitted. Further, the display device 300 is an example of the "display device" of the present invention.

According to one or more embodiments of this third example, a bent portion 325 (instead of the bent portion 225 of the second example) may be formed by providing a stepped portion 325a on an engagement plate portion 322 of a rear frame 320.

As illustrated in FIG. 9, the display device 300 (see FIG. 1) may be provided with the rear frame 320. A hole portion 323 of an elongated shape extending in the lateral direction (X direction) may be formed on the engagement plate portion 322 of the rear frame 320. Further, the stepped portion 325a bent in the upper direction (Z1 direction) on a front-direction side (Y1-direction side) of the hole portion 323 may be formed on the engagement plate portion 322. Further, a bent portion 325 of a convex shape may be formed on the upper-direction side (Z1-direction side) by this stepped portion 325a on the engagement plate portion 322. The bent portion 325 is an example of the "disengagement prevention portion" of the present invention.

Other configurations of the third example may be similar to those of the second embodiment above.

According to one or more embodiments of the third example, the following advantages can be obtained.

According to one or more embodiments of the third example, similar to the second example above, by providing the bent portion 325 that prevents the engagement hole portion 243 from disengaging in the front direction (Y1 direction) from the engagement plate portion 322, the optical sheet 240 can be prevented from falling out of the rear frame 320 during assembly. Further, the number of components to assemble the display device can be reduced.

Other effects of the third example may be similar to those of the second example above.

Fourth Example

A configuration of a display device 400 (see FIG. 1) according to one or more embodiments of a fourth example of the present invention will be described with reference to FIGS. 1 and 10. Further, configurations similar to those of the first and second examples will be labeled with the same reference signs, and descriptions thereof will be omitted. Further, the display device 400 is an example of the "display device" of the present invention.

According to one or more embodiments of this fourth example, a narrowed portion 425 having a function similar to that of the bent portion 225 of the second example may be formed by a narrowing process on an engagement plate portion 422.

As illustrated in FIG. 10, the display device 400 may comprise a rear frame 420. A hole portion 423 of an elongated shape extending in the lateral direction (X direction) may be formed on the engagement plate portion 422 of the rear frame 420. Further, the narrowed portion 425 of a convex and semicircular shape that expands in the lower direction (Z2 direction) may be formed on the engagement plate portion 422. The narrowed portion 425 is an example of the "disengagement prevention portion" of the present invention.

Other configurations of the fourth example may be similar to those of the second example above.

According to one or more embodiments of the fourth example, the following advantages can be obtained.

According to one or more embodiments of the fourth example, similar to the second example above, by providing the narrowed portion 425 that prevents the engagement hole portion 243 from disengaging in the front direction (Y1 direction) from the engagement plate portion 422, the optical sheet 240 can be prevented from falling out of the rear frame 420 during assembly. Further, a fewer number of components is required to assemble the display device 400.

Other effects of the fourth example may be similar to those of the second example above.

Embodiments of the present invention herein disclosed are examples on all counts and should not be considered to be limiting. The scope of the present invention is indicated not by the above description of the embodiments but by the scope of the claims below.

For instance, although third example above, as shown in FIG. 8, includes a bent portion 225 being formed by folding back (bending 180 degrees) the tip portion of the engagement plate portion 222, the present invention is not limited thereto. In one or more embodiments of the present invention, for example, as illustrated in FIG. 11, a bent portion 525 may be formed without folding back a tip of an engagement plate portion 522 but by bending 90 degrees a tip portion so as to face the lower direction (Z2 direction).

Furthermore, although the first to fourth examples above relate to a display device, the present invention is not limited thereto. For example, one or more embodiments of the present invention may be applied to a television device.

Furthermore, although the fourth example above, as illustrated in FIG. 10, includes a narrowed portion 425 being formed in a semicircular shape, the present invention is not limited thereto. In one or more embodiments of the present invention, for example, as illustrated in FIG. 12, a narrowed portion 625 may be formed as a circular shape.

Furthermore, although the bent portion or the narrowed portion of the second to fourth examples above is formed by elastically deforming the engagement plate portion, the present invention is not limited thereto. In one or more embodiments the present invention, for example, as illustrated in FIG. 13, scribe lines 725 may be formed on both faces in upper and lower directions (Y1 direction and Y2 direction) of an engagement plate portion 722 without elastically deforming the engagement plate portion. As a result, the optical sheet is caught by the scribe lines when moving in the Y direction, and movement of the optical sheet 240 in a falling-out direction (Y1 direction) is therefore prevented.

Furthermore, although the first to fourth examples include two engagement plate portions formed respectively on the Z1-direction side and the X1-direction side, the present invention is not limited thereto. In one or more embodiments of the present invention, for example, three engagement plate portions may be formed respectively on the Z1-direction side and the X1-direction side. Further, the engagement plate portion may be formed on the Z1-direction side alone.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE NUMBERS LIST 20, 220, 320, 420 Rear frame
21 Outer edge portion
22a, 22b, 22c, 22d, 222, 322, 422 Engagement plate portion (rear frame-side engagement portion)
23 Hole portion (disengagement prevention portion) (overlapping portion)
51 Display
51a Upper edge
40, 240 Optical sheet
43a, 43b, 46a, 46b, 243 Engagement hole portion (optical sheet-side engagement portion)
44, 47 Protruding portion (disengagement prevention portion) (overlapping portion)
100, 200, 300, 400 Display device (display device)
225, 325 Bent portion (disengagement prevention portion)
425 Narrowed portion (disengagement prevention portion)

What is claimed is:
1. A display device, comprising:
a display;
a rear frame disposed on a rear side of the display and comprising a rear frame-side engagement portion that protrudes toward the display in a front direction; and an optical sheet comprising an optical sheet-side engagement portion comprising a slit or a notch that engages with the rear frame-side engagement portion, wherein the optical sheet-side engagement portion is snapped onto the rear frame-side engagement portion and causes the optical sheet to be suspended by the rear frame, the rear frame-side engagement portion comprises a hole portion, and the optical sheet-side engagement portion comprises a protruding portion inserted in the hole portion.

2. The display device according to claim 1, wherein the rear frame-side engagement portion is formed in a plate-like shape extending along a direction in which an upper edge of the display extends.

3. The display device according to claim 2, wherein the slit or the notch has an elongated shape.

4. The display device according to claim 2, wherein the rear frame-side engagement portion is snapped onto the slit or the notch.

5. The display device according to claim 2, wherein the optical sheet-side engagement portion is snapped onto the rear frame-side engagement portion and engages with the optical sheet-side engagement portion.

6. The display device according to claim 2, wherein the rear frame-side engagement portion and the optical sheet-side engagement portion at least partially overlap each other at the hole portion and the protruding portion, when viewed from a front side of the display device.

7. The display device according to claim 1, wherein the slit or the notch has an elongated shape.

8. The display device according to claim 7, wherein the rear frame-side engagement portion is snapped onto the slit or the notch.

9. The display device according to claim 7, wherein the optical sheet-side engagement portion is snapped onto the rear frame-side engagement portion and engages with the optical sheet-side engagement portion.

10. The display device according to claim 7, wherein the rear frame-side engagement portion and the optical sheet-side engagement portion at least partially overlap each other at the hole portion and the protruding portion, when viewed from a front side of the display device.

11. The display device according to claim 1, wherein the rear frame-side engagement portion is snapped onto the slit or the notch.

12. The display device according to claim 11, wherein the optical sheet-side engagement portion is snapped onto the rear frame-side engagement portion and engages with the optical sheet-side engagement portion.

13. The display device according to claim 11, wherein the rear frame-side engagement portion and the optical sheet-side engagement portion at least partially overlap each other at the hole portion and the protruding portion, when viewed from a front side of the display device.

14. The display device according to claim 1, wherein the optical sheet-side engagement portion is snapped onto the rear frame-side engagement portion and engages with the optical sheet-side engagement portion.

15. The display device according to claim 14, wherein the rear frame-side engagement portion and the optical sheet-side engagement portion at least partially overlap each other at the hole portion and the protruding portion, when viewed from a front side of the display device.

16. The display device according to claim 1, wherein the rear frame-side engagement portion and the optical sheet-side engagement portion at least partially overlap each other at the hole portion and the protruding portion, when viewed from a front side of the display device.

17. The display device according to claim 16, wherein the hole portion penetrates through the rear frame-side engagement portion in a thickness direction, the optical sheet-side engagement portion comprises an engagement hole portion that engages the rear frame-side engagement portion, the protruding portion protrudes to a hole-portion side of the rear frame-side engagement portion and abuts an inside of the hole portion, and the rear frame-side engagement portion is snapped onto the engagement hole portion to be engaged with the optical sheet-side engagement portion and causes the optical sheet-side engagement portion to be prevented from disengaging in the front direction from the rear frame-side engagement portion by the protruding portion of the optical sheet-side engagement portion abutting an inner face of the hole portion of the rear frame.

18. The display device according to claim 17, wherein a protruding amount of the protruding portion is greater than a difference between a width of the engagement hole portion and a thickness of the rear frame-side engagement portion in a protruding direction of the protruding portion.

* * * * *